US009667411B2

(12) United States Patent
Kumar

(10) Patent No.: US 9,667,411 B2
(45) Date of Patent: May 30, 2017

(54) MEDIA SUPPORT IN SECURE MOBILE APPLICATIONS

(71) Applicant: Citrix Systems, Inc., Fort Lauderdale, FL (US)

(72) Inventor: Krishna Kumar, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/742,811

(22) Filed: Jun. 18, 2015

(65) Prior Publication Data

US 2016/0373251 A1 Dec. 22, 2016

(51) Int. Cl.
*H04L 9/32* (2006.01)
*H04L 9/08* (2006.01)
*H04L 29/08* (2006.01)
*H04L 29/06* (2006.01)

(52) U.S. Cl.
CPC .............. *H04L 9/08* (2013.01); *H04L 63/10* (2013.01); *H04L 67/02* (2013.01); *H04L 67/10* (2013.01)

(58) Field of Classification Search
CPC . H04L 63/0428; H04L 63/08; H04L 2209/24; H04L 63/10; H04L 63/0435
USPC .......................................................... 713/168
See application file for complete search history.

(56) References Cited

U.S. PATENT DOCUMENTS

2015/0358328 A1* 12/2015 Kaplan ............... H04L 67/1095
726/6

* cited by examiner

*Primary Examiner* — Kambiz Zand
*Assistant Examiner* — Stephen Sanders
(74) *Attorney, Agent, or Firm* — Banner & Witcoff, Ltd.

(57) ABSTRACT

Methods, systems, computer-readable media, and apparatuses for providing secure resources to a native operating system resource are described herein. Using one or more aspects described herein, a mobile device may determine that a native operating system service requests to access content located within a wrapped application. The mobile device may transmit, to the native operating system service, a server path to a loopback web server within the wrapped application to elicit a request from the native operating system service to the loopback web server for the content. In response to receiving a request comprising the server path to the loopback web server to retrieve the content from the loopback web server, the mobile device may instruct the loopback web server to transmit an unencrypted version of the content to the native operating system service.

20 Claims, 7 Drawing Sheets

MEDIA SUPPORT IN SECURE MOBILE APPLICATIONS

TECHNICAL FIELD

Aspects of the disclosure generally relate to computing hardware and computer software. In particular, one or more aspects of the disclosure relate to mobile devices that provide enhanced security for an enterprise application while providing native media support for audiovisual content.

BACKGROUND

Mobile devices are becoming increasingly popular for both personal use and business use. Corporations and other organizations are providing their employees and other associates with, and/or otherwise enabling their employees and other associates to use, mobile devices, such as smart phones, tablet computers, and other mobile computing devices. As these devices continue to grow in popularity and provide an increasing number of functions, many organizations may wish to ensure that the software applications that are executing on such devices are safe and secure, both for the protection of the device users and for the protection of the organization itself and its own computer systems and networks.

In many instances, corporations and other organizations may deploy, use, and/or otherwise provide their employees and other associates with many different software applications to be used on mobile devices owned or otherwise provided by their employees. These devices and environment are referred to as Bring-Your-Own-Device (BYOD). In order to ensure the security of enterprise information, one or more of the enterprise applications may be a "wrapped" application, designed to intercept various OS and/or API calls and redirecting them to enterprise approved software and/or locations, and also ensuring that enterprise data is communicated only in a secure format (e.g., encrypted). However, this disrupts the ability of wrapped applications to use OS provided resources that rely on unencrypted input, such as media players. A wrapped application cannot simply "turn off" encryption, because to do so would create a security weakness insofar as the wrapped application could export unencrypted enterprise data.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed providing support for multimedia files in secure mobile applications, such as enterprise applications and wrapped applications that otherwise do not have the ability to access such files.

A first aspect described herein provides a method of providing secure resources to a native operating system resource. A mobile device may determine that a native operating system service requests to access content located within a wrapped application. The mobile device may transmit, to the native operating system service, a server path to a loopback web server within the wrapped application to elicit a request from the native operating system service to the loopback web server for the content. In response to receiving a request comprising the server path to the loopback web server to retrieve the content from the loopback web server, the mobile device may send the request to the loopback web server requesting that the loopback web server transmit an unencrypted version of the content to the native operating system service.

In some embodiments, the server path or file path may be encrypted or randomized using a security token. The mobile device may determine whether the request to retrieve the content from the native operating system service comprises the security token. The mobile device may then pass the token to the loopback web server to identify the requested content In some embodiments, access to the loopback web server and the server path may be limited to applications and processes executing on the mobile device.

In some embodiments, in response to receiving the request at the server path from the native operating system service, the mobile device may identify the file path of the content by consulting the mapping. The mobile device may retrieve the content at the identified file path. The mobile device may instruct the loopback web server to generate the unencrypted version of the content from the content at the identified file path within the wrapped application for transmission to the native operating system service.

Additional aspects described herein provides an apparatus having one or more processors, one or more display screens, and memory storing instructions that, when executed by at least one of the processors cause the computing device to perform the methods set forth above.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and in which.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards providing multimedia support to wrapped applications in a manner consistent with enterprise security requirements. Using one or more aspects described herein, mobile enterprise applications, such as wrapped applications (discussed below), can play back audio and video files using a native media player provided by the operating system of a mobile device, whereby previously a mobile device's native media player could not play audio or video files provided by a wrapped application because the files were accessible only in encrypted format. Aspects describes herein provide secure techniques for passing unencrypted versions of media files to a mobile device operating system without creating an exploitable hole in an enterprise security system.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
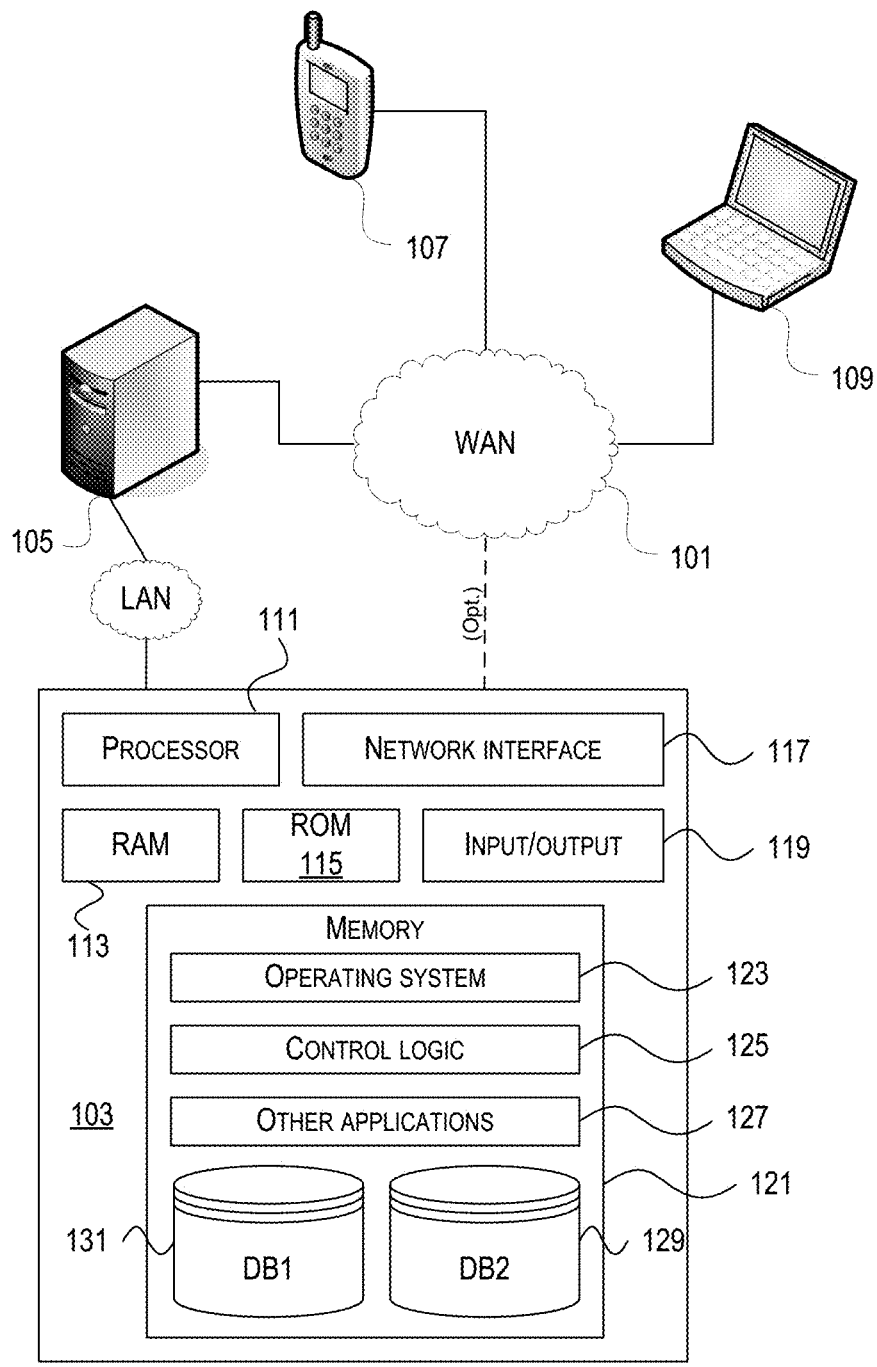
FIG. 1 depicts an illustrative computer system architecture that may be used in accordance with one or more example embodiments.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
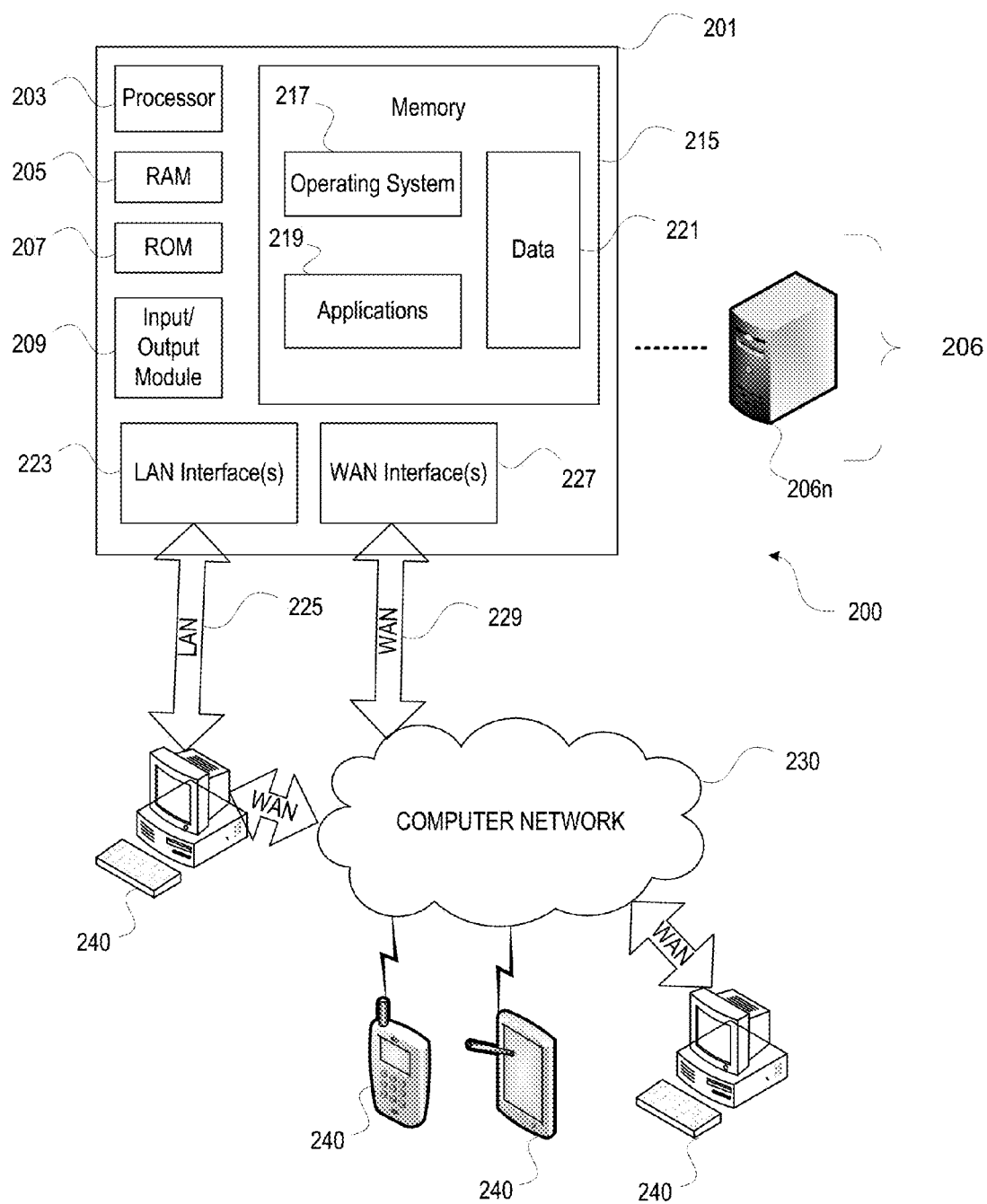
FIG. 2 depicts an illustrative remote-access system architecture that may be used in accordance with one or more example embodiments.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
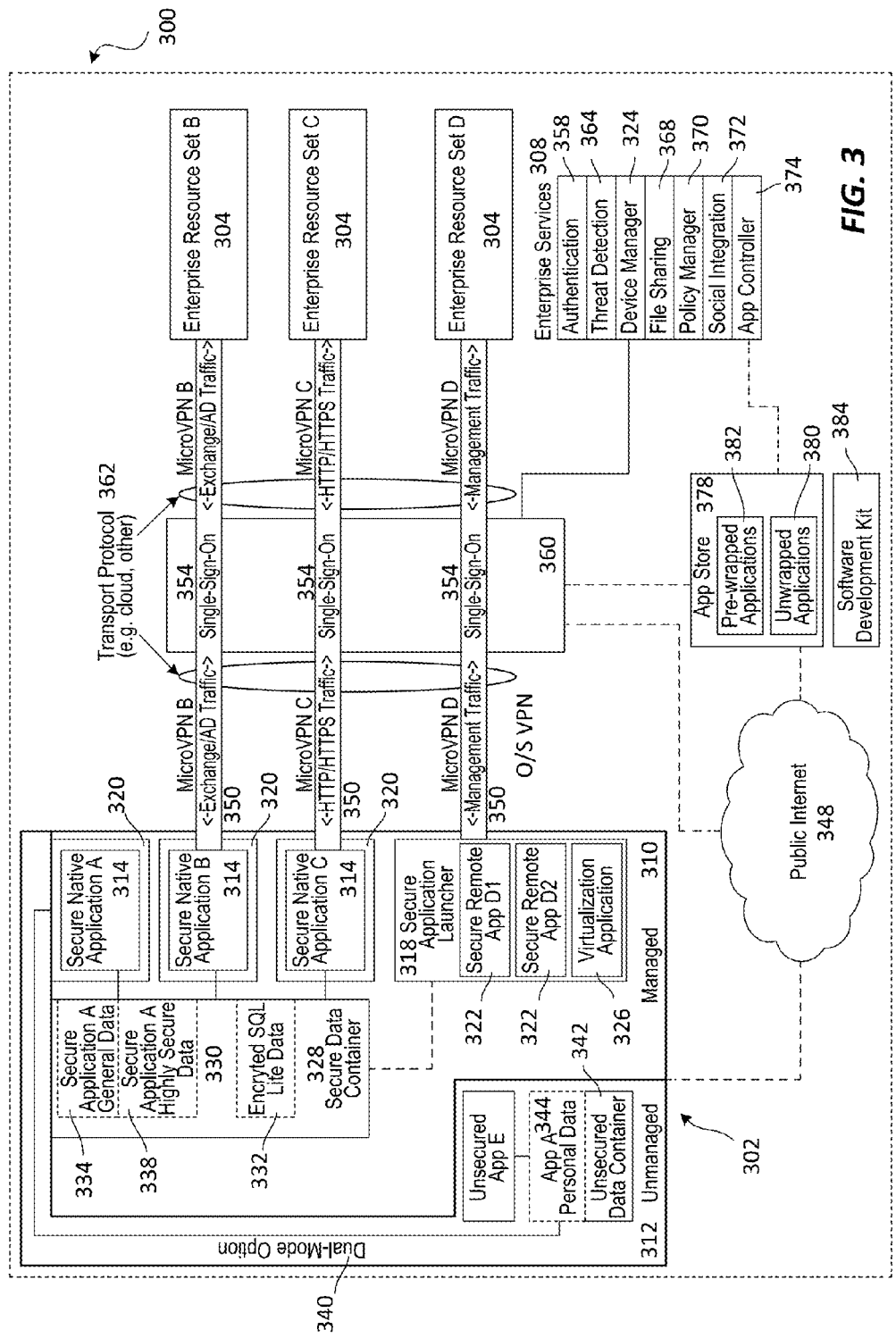
FIG. 3 depicts an illustrative enterprise mobility management system that may be used in accordance with one or more example embodiments.

FIG. 3 represents an enterprise mobility technical architecture 300 for use in a BYOD environment. The architecture enables a user of a client device (e.g., mobile device) 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 580, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
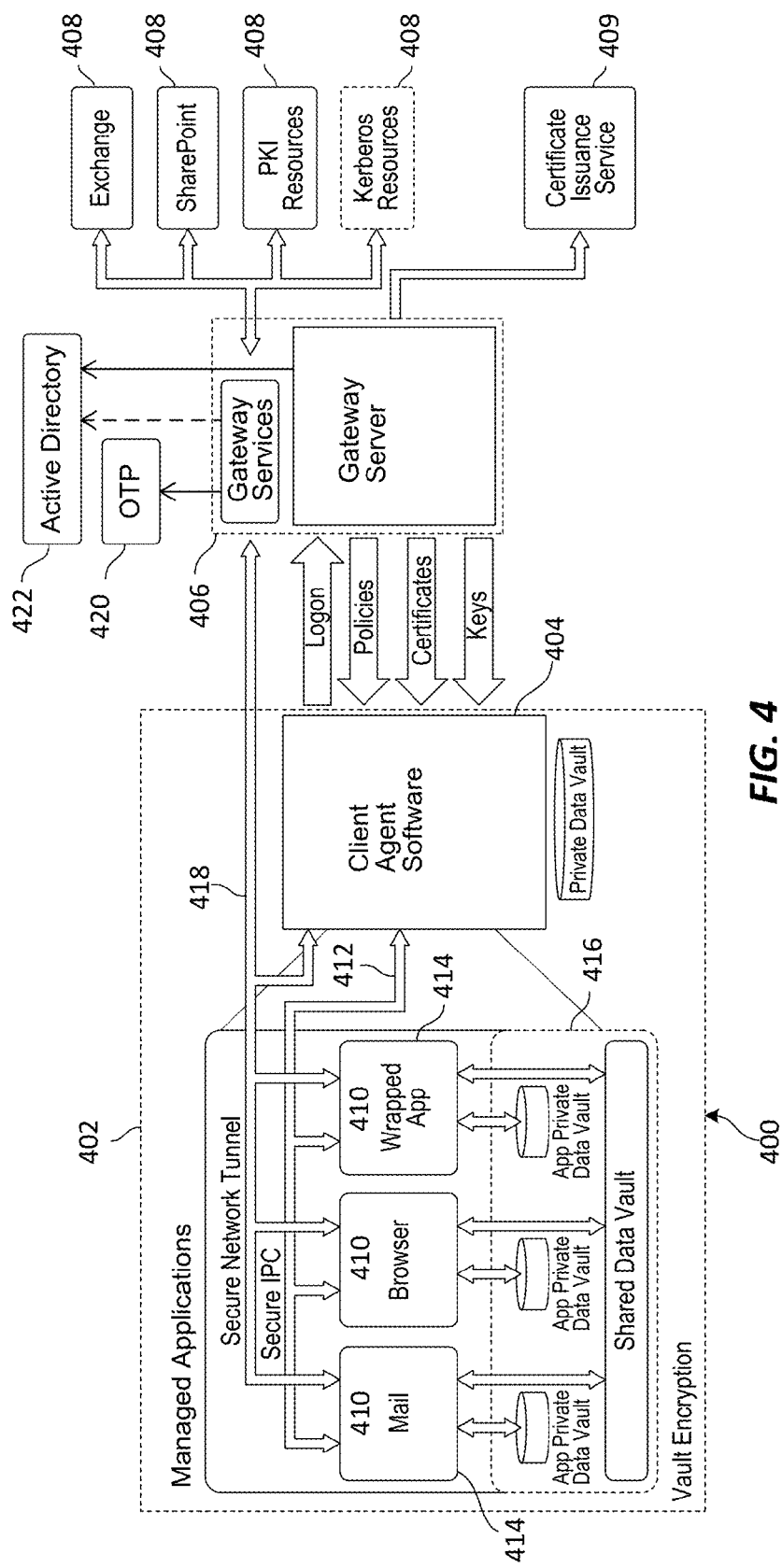
FIG. 4 depicts another illustrative enterprise mobility management system that may be used in accordance with one or more example embodiments.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 609 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Multimedia Support

Figure 5:
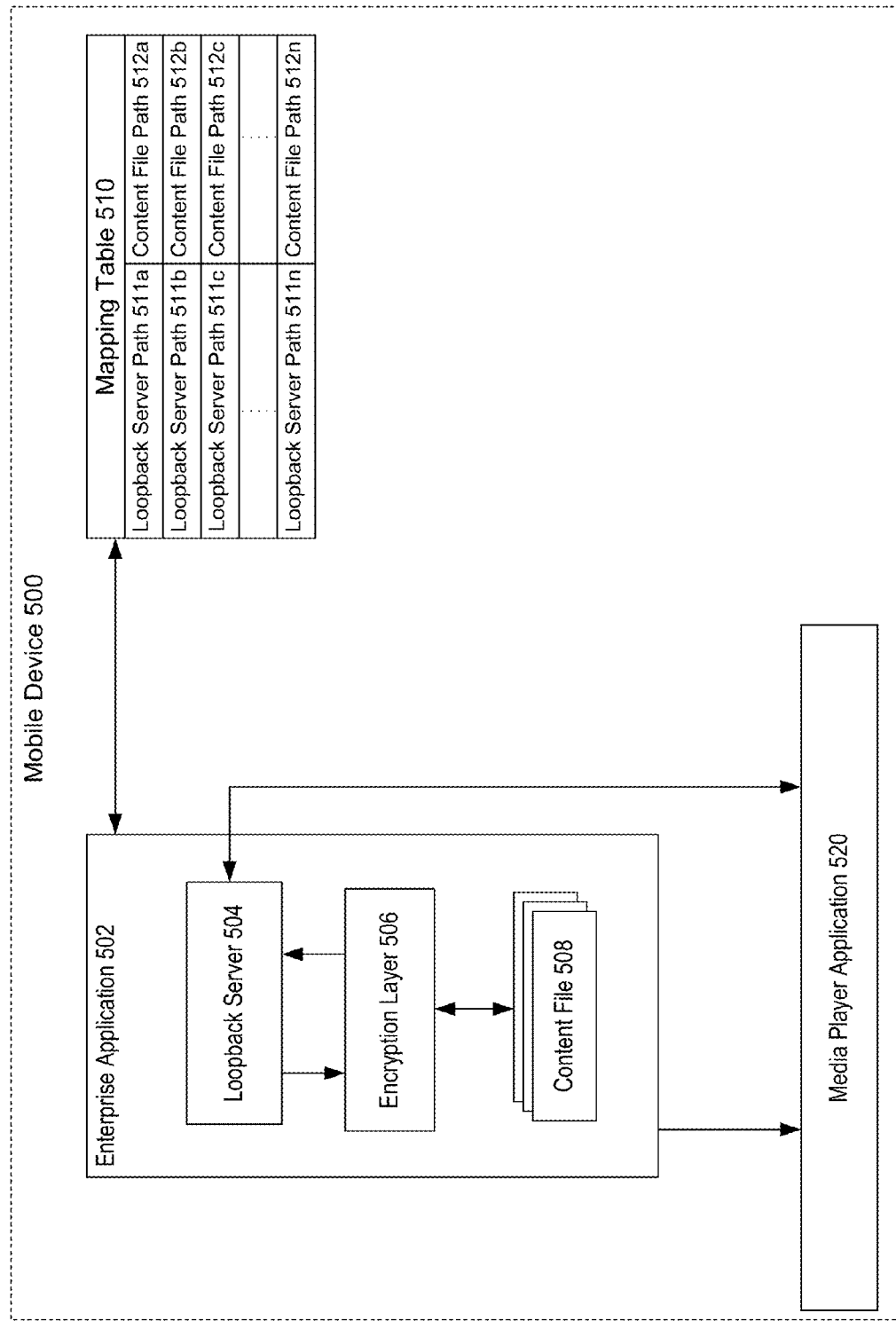
FIG. 5 depicts an illustrative computing environment for providing multimedia support for wrapped applications in accordance with one or more example embodiments.

FIG. 5 depicts an illustrative computing environment for providing multimedia support for wrapped applications in accordance with one or more example embodiments. An enterprise application 502, as shown in FIG. 5, may be a "wrapped" application executing on mobile device 500. The enterprise application 502 may be designed to intercept various OS and/or API calls and redirect them to enterprise approved software and/or locations, and ensure that enterprise data is communicated only in a secure format (e.g., encrypted). The enterprise application 502 may be configured to play media files using native OS services of the mobile device 500. For example, the enterprise application 508 may instruct a media player application 520, executing on the mobile device 500, to play content file 508. Content file 508 may be encrypted according to the encryption policies of enterprise application 502. An operating system service or unencrypted application, such as media player application 520, may not be capable of playing encrypted content files. Accordingly, the enterprise application 502 may process the media content file 508 to provide an unencrypted version of the encrypted content file 508 in a secure manner to media player application 520 for playback. Similarly, enterprise application 502 may process all data communicated to OS provided resources and unencrypted application executing on the mobile device 500 such that an unencrypted version of the secure content is transmitted to such OS provided resources in a secure manner without turning off encryption in the enterprise application 502. The enterprise application 502 cannot simply "turn off" encryption, because to do so would create a security weakness insofar as the wrapped application could export unencrypted enterprise data.

In some embodiments, unencrypted content files may be read and/or played back by OS resources such as media player application 520 by using a file descriptor. When a mobile application instructs an OS resource to access a content file for playback, the mobile application may set the content file's file path, hereinafter also referred to as the uniform resource identifier (URI), as the data source for the OS resource from which the OS resource is to retrieve the file content. The mobile application may transmit the URI for the content file to the OS resource. Upon receiving the target content file's file descriptor, the OS service may access the URI of the file content by reading the file descriptor and accordingly access the file content for playback and/or other activities.

In some embodiments, enterprise application 502 may provide an unencrypted version of encrypted content files such as content file 508 to OS resources such as media player application 520. Instead of providing the media player application 520 with the file path (e.g., URI) of the content file 508, the enterprise application 502 may transmit a server path to loopback server 504. The enterprise application 502 may instruct the processor of the mobile device 500 to generate a loopback web server, such as loopback server 504, within the enterprise application 502. The loopback server 504 may only be accessible to applications and processes executing on the mobile device 500 and inaccessible to processes and networks outside the mobile device 500. For example, the loopback server 504 may have a network interface that is only accessible by OS resources and applications executing on mobile device 500 and not to outside users and/or processes. The loopback server 504 may be able to access various enterprise resources such as secured content file 508. The loopback server 504 may assign a loopback server path to each such enterprise resource such as secure content file path 508 such that when a native application and/or OS resource request the loopback server 504 to access the enterprise resource using a loopback server path corresponding to the enterprise resource, the loopback server 504 may access the enterprise resource at its actual content file path, decrypt the enterprise content so that the requesting OS resource and/or native application may be able to access the enterprise resource, and transmit the decrypted enterprise resource to the requesting OS resource and/or native application.

In some embodiments, the loopback server path may have access to a mapping table 510 that stores associations between loopback server paths and content file paths. The enterprise application 502 may store associations between actual content file paths of different enterprise resources such as content file 508 and the corresponding loopback server file path used by the loopback server 504 to refer to those corresponding enterprise resources. For example, when the enterprise application 502 gains access to content file 508, the enterprise application 502 may generate a loopback server path 511a for the content file 508 and may store an association between the actual content file path 512a of the content file 508 and the loopback server path 511a in the mapping table 510. As shown in FIG. 5, the mapping table 510 may similarly include associations between several different content file paths 512a-n and their corresponding loopback server paths 511a-n. The loopback server 504 may consult such a mapping table 510 to retrieve the content file path of a content file that it is being requested when the loopback server 504 receives a loopback server path from a native application and/or OS resource attempting to access the content file.

In some embodiments, the enterprise application 502 may transmit a loopback server path to an operating system service (e.g., the media player application) when it desires to have that operating system service access the content file. For example, when the enterprise application 502 determines that media player application 520 (e.g., a native application on the mobile device 500) is to play the content file 508, the enterprise application 502 may identify the loopback server path corresponding to the content file 508 (e.g., loopback server path 511*a*) and transmit the loopback server path 511*a* to the media player application 520.

In some embodiments, the loopback server path that is transmitted to the operating system service may cause the operating system service to transmit a request to the loopback server 504 for the content file. For example, the enterprise application 502 may transmit the loopback server path 511*a* corresponding to content file 508 to trigger a request from the media player application 520 and to the loopback server 504 for the content file 508. Because the loopback server 504 is capable of providing the media player application 520 with an unencrypted version of the content file 508, the enterprise application 502 may transmit the loopback server path 511*a* to the media player application 520 with the expectation of receiving a request at the loopback server 504 from the media player application 520.

Once the loopback server 504 receives a content request for the content file 508, the loopback server 504 may consult the mapping table 510 to determine the location of the content file 508. The loopback server 504 may identify the actual file path at which the requested content file 508 is stored from the mapping table 510 by using the received loopback server path from the media player application 520. The actual file path of enterprise content files may not be revealed or made known to any processes and/or applications outside the enterprise application 502. An alias such as the loopback server path may be used to mask the actual file path at which content files are stored to maintain the security of the enterprise resources.

In some embodiments, the loopback server 504 may generate and transmit an unencrypted version of the content file 508 to the operating system service that is requesting it for the content file. By reading the content file 508 within the context of the encryption layer 506, the loopback server 504 may generate an unencrypted version of content file 508. In some implementations, the content file may be decrypted in a piecemeal manner such that portions of the content file that have been decrypted may be transmitted to the media player application 520 while portions of the content file 508 may be decrypted by the loopback server 504. In another implementation, the loopback server 504 may transmit an unencrypted version of the content file 508 once it has completed decrypting the entire content file 508.

In some embodiments, the loopback server path that is communicated to the operating system service on mobile device 500 may be secured or encrypted. For example, the enterprise application 502 may encrypt or replace the loopback server path or the file location with a security token that each operating system service and native application executing on the mobile device 500 may in turn send back to the loopback server to retrieve the associated content. Because the loopback server path is generated and encrypted within the enterprise application 502, no outside processes, users, and/or software may have access to the loopback server path and accordingly, no such process, user, and/or software external to the mobile device 500 may be able to contact the loopback server 504 to request unencrypted versions of secure content files such as content file 508. Alternatively, the loopback server path may be generated by the enterprise application 502 in a randomized manner during runtime of the enterprise application 502. In the event that malicious applications have been installed and/or begin executing on the mobile device 500, such malicious processes and/or applications are not able to gain knowledge of the loopback server paths. Because malicious processes and/or applications are not native applications and/or operating system resources, such malicious processes and/or applications are not able to decrypt the encrypted loopback server paths that are transmitted by the enterprise application 502 to their target OS resources. In addition, because the loopback server 504 may only be accessed by OS resources and/or native applications that provide a loopback server path or token previously communicated to them, malicious processes and/or applications are not able to access the loopback server 504.

Figure 6:
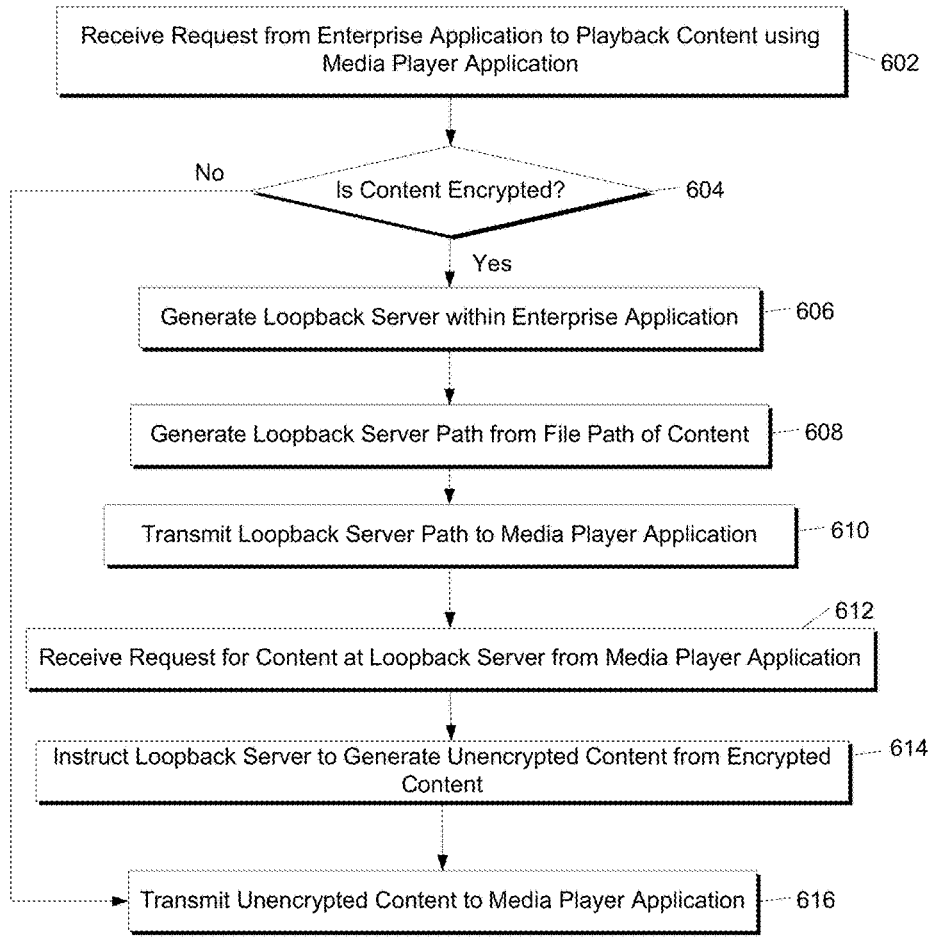
FIG. 6 depicts a flowchart that illustrates a method for enabling a media player application to play encrypted content from an enterprise application in accordance with one or more illustrative aspects described herein.

FIG. 6 depicts a flowchart that illustrates a method for enabling a media player application to play encrypted content from an enterprise application in accordance with one or more illustrative aspects described herein. In one or more embodiments, the method of FIG. 6 and/or one or more steps thereof may be performed by a computing device (e.g., generic computing device 201). In other embodiments, the method illustrated in FIG. 6 and/or one or more steps thereof may be embodied in computer-executable instructions that are stored in a computer-readable medium, such as a non-transitory computer-readable memory.

As shown in FIG. 6, the method may begin at step 602 in which a mobile device may receive a request from an enterprise application (e.g., wrapped application) to playback content using a media player application. For example, an enterprise application such an enterprise mobile email application may desire to playback an enterprise media content attached in an email received by the mobile email application. The enterprise mobile email application executing on the mobile device may instruct the native media player application of the mobile device to play back the enterprise media content attachment and may create a request for the processor of the mobile device to playback the enterprise media content using the native media player application.

At step 604, the mobile device may determine whether the content is encrypted. The mobile device may identify the content from the request and determine whether the native media player application can playback the content. Typically, native media player applications are incapable of playing back media content that has been encrypted according to the security protocols of enterprise mobile applications. The mobile device may examine the media content to determine whether the enterprise media content includes indicators indicating that it has been encrypted using the security protocols of the enterprise application. In response to determining that the content is not encrypted, the method 600 may proceed to step 616 to transmit the unencrypted content to the media player application.

At step 606, in response to determining that the content is encrypted, the mobile device may generate a loopback server within the enterprise application. The mobile device may instruct the enterprise application to generate a loopback web server within the enterprise application that is only accessible to mobile applications and OS resources executing on the mobile device. The loopback web server may be generated to be able to decrypt encrypted enterprise content to provide unencrypted versions of such enterprise content to native mobile applications and OS resources executing on the mobile device.

At step 608, the mobile device may generate a loopback server path from the file path of the content. The mobile device may generate loopback server paths for various different enterprise content that map to the actual file paths (e.g., local and/or network addresses) of the enterprise content. The mobile device may generate different loopback server paths for different content such that the enterprise application may be able to identify which content an OS resource is referring to when it submits a request to the loopback server with a server path.

At step 610, the mobile device may transmit the loopback server path to the media player application. Upon identifying the loopback server path corresponding to the media content that is to be played back by the native media player application, the enterprise application may transmit the identified loopback server path for that media content to the media player application. In transmitting the loopback server path to the media player application, the enterprise application expects to receive a request from the media player application to stream the media content from the loopback web server.

At step 612, the mobile device may receive a request for content at the loopback server from the media player application. Once the media player application receives the loopback server path from the enterprise application, the media player application may automatically respond to the server path by transmitting a request to the loopback server to stream the media content corresponding to the server path. The message received from the enterprise application at the media player application including the loopback server path may be configured to cause the media player application to generate such a request to the loopback web server. Accordingly, the loopback web server may receive a request to stream the enterprise content from the loopback server path.

At step 614, the mobile device may generate the unencrypted content from the encrypted content at the loopback server. Upon receiving a request to stream enterprise content with a loopback server path identifying the enterprise content, the loopback server may identify the actual file path of the enterprise content by consulting a mapping table storing associations between the loopback server paths of various enterprise content and their corresponding actual file paths. Once the loopback server identifies the actual file path of the requested enterprise content requested by the media player application, the loopback server may generate an unencrypted version of the encrypted enterprise content suitable for playback in the media player application. Because the loopback web server is a web server that exists within the wrapped enterprise application, the loopback web server is able to access the encryption layer of the enterprise application that can be used to decrypt the encrypted enterprise content. By reading the enterprise content within the context of such an enterprise application encryption layer, the loopback web server is able to generate an unencrypted version of the enterprise content.

At step 616, the mobile device may transmit the unencrypted content to the media player application. Once the loopback web server has generated an unencrypted version of the enterprise content that is suitable for playback on the media player application, the enterprise application may transmit the unencrypted content to the media player application.

Figure 7:
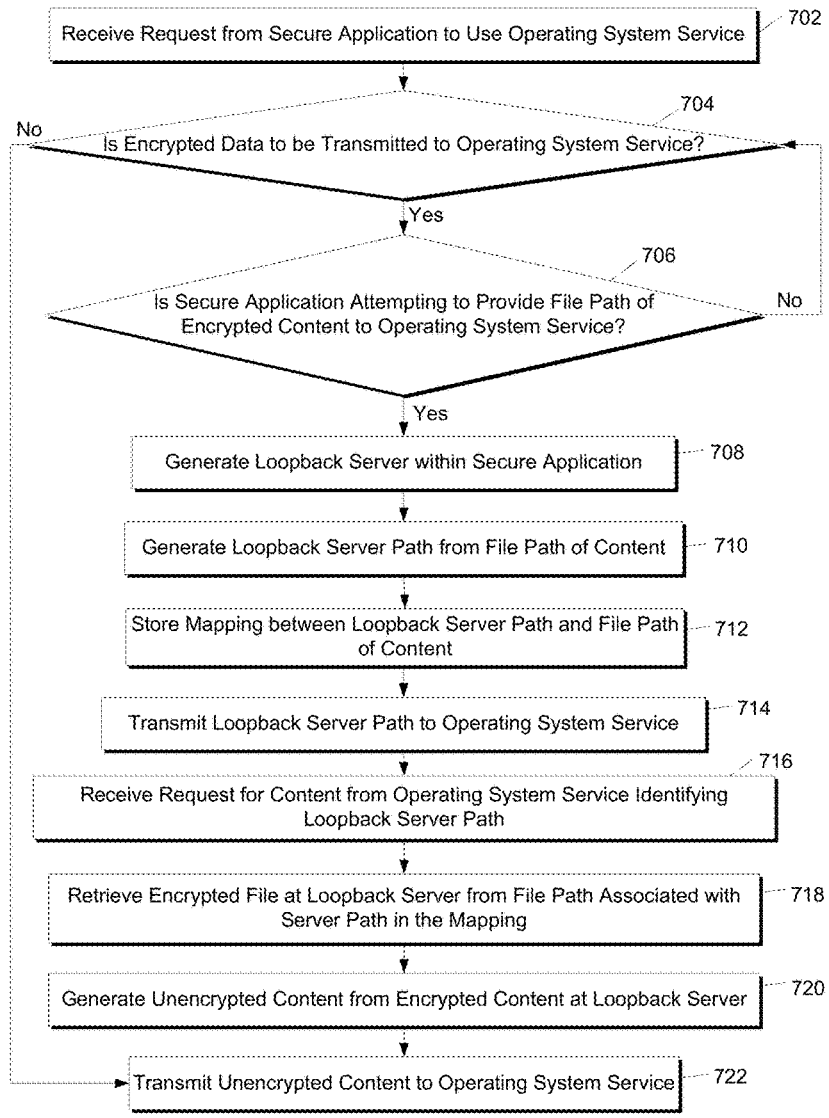
FIG. 7 depicts a flowchart that illustrates a method for enabling an operating system service to access encrypted content from an enterprise application in accordance with one or more illustrative aspects described herein.

FIG. 7 depicts a flowchart that illustrates a method for enabling an operating system service to access encrypted content from an enterprise application in accordance with one or more illustrative aspects described herein. In one or more embodiments, the method of FIG. 7 and/or one or more steps thereof may be performed by a computing device (e.g., generic computing device 201). In other embodiments, the method illustrated in FIG. 7 and/or one or more steps thereof may be embodied in computer-executable instructions that are stored in a computer-readable medium, such as a non-transitory computer-readable memory.

As shown in FIG. 7, the method may begin at step 702 in which a mobile device may receive a request from a secure application to use an operating system service. For example, an enterprise application such an enterprise mobile email application may desire to access an enterprise content attachment that can be only opened using a native operating system service. The enterprise mobile email application executing on the mobile device may instruct the native OS service of the mobile device to access the enterprise media content attachment and may create a request for the processor of the mobile device to use the OS service to access the enterprise content.

At step 704, the mobile device may determine whether encrypted data is to be transmitted to the operating system service. The mobile device may determine whether the enterprise content is encrypted. The mobile device may identify the content from the request and determine whether the native OS service can access the enterprise content without further processing the content. Typically, native OS services are incapable of reading enterprise content that has been encrypted according to the security protocols of enterprise mobile applications. The mobile device may examine the enterprise content to determine whether the enterprise media content includes indicators indicating that it has been encrypted using the security protocols of the enterprise application. In response to determining that encrypted data is not to be transmitted to the operating system service, the method 700 may proceed to step 722 to transmit unencrypted content to the operating system service.

At step 706, in response to determining that the encrypted data is to be transmitted to the operating system service, the mobile device may determine whether the secure enterprise application is attempting to provide a file path of the encrypted content to the operating system service. The mobile device may determine how the enterprise application is configured to instruct the native OS service to access the enterprise content. The mobile device determines if the enterprise application has an OS service access the enterprise content by providing the file path and/or the content itself to the OS service. The mobile device may attempt to prevent the enterprise application from providing the OS service with the encrypted content and/or the file path to the encrypted content to prevent the OS service from malfunctioning and to maintain the security of the enterprise content. In response to determining that the secure application is not attempting to provide a file path of the encrypted content to the operating system service, the method 700 may return to step 704 to determine whether other encrypted data is to be transmitted to the operating system service.

At step 708, in response to determining that the secure application is attempting to provide a file path of the encrypted content to the operating system service, the mobile device may generate a loopback server within the secure enterprise application. The mobile device may instruct the enterprise application to generate a loopback web server within the enterprise application that is only accessible to mobile applications and OS resources executing on the mobile device. The loopback web server may be generated to be able to decrypt encrypted enterprise content to provide unencrypted versions of such enterprise content to native mobile applications and OS resources executing on the mobile device.

At step 710, the mobile device may generate a loopback server path from the file path of the content. The mobile device may generate loopback server paths for various different enterprise content that map to the actual file paths (e.g., local and/or network addresses) of the enterprise content. The mobile device may generate different loopback server paths for different content such that the enterprise application may be able to identify which content an OS resource is referring to when it submits a request to the loopback server with a server path.

At step 712, the mobile device may store the association between the loopback server path and the file path of the content in a mapping. The mobile device may access a map such as mapping table 510 of FIG. 5 that stores associations between loopback server paths of enterprise content and the actual file paths of enterprise content. As new enterprise content becomes available, the mobile device may generate new loopback server paths for such new enterprise content and update such a database with such new associations.

At step 714, the mobile device may transmit the loopback server path to the operating system service. Upon identifying the loopback server path corresponding to the enterprise content that is to be played back by the native OS service, the enterprise application may transmit the identified loopback server path for that enterprise content to the native OS service. In transmitting the loopback server path to the native OS service, the enterprise application expects to receive a request from the native OS service to stream the enterprise content from the loopback web server.

At step 716, the mobile device may receive the request for content from the operating system service identifying the loopback server path. Once the native OS service receives the loopback server path from the enterprise application, the native OS service may automatically respond to the server path by transmitting a request to the loopback server to transmit the enterprise content corresponding to the server path. The message received from the enterprise application at the native OS service including the loopback server path may be configured to cause the native OS service to generate such a request to the loopback web server. Accordingly, the loopback web server may receive a request to transmit the enterprise content from the loopback server path.

At step 718, the mobile device may retrieve the encrypted file at the loopback server from the file path associated with the server path in the mapping. Upon receiving a request to transmit enterprise content with a loopback server path identifying the enterprise content, the loopback server may identify the actual file path of the enterprise content by consulting a mapping table storing associations between the loopback server paths of various enterprise content and their corresponding actual file paths.

At step 720, the mobile device may instruct the loopback server to generate unencrypted content. Once the loopback server identifies the actual file path of the requested enterprise content requested by the native OS service, the loopback server may generate an unencrypted version of the encrypted enterprise content suitable for playback in the native OS service. Because the loopback web server is a web server that exists within the wrapped enterprise application, the loopback web server is able to access the encryption layer of the enterprise application that can be used to decrypt the encrypted enterprise content. By reading the enterprise content within the context of such an enterprise application encryption layer, the loopback web server is able to generate an unencrypted version of the enterprise content.

At step 722, the mobile device may transmit the unencrypted content to the operating system service. Once the loopback web server has generated an unencrypted version of the enterprise content that is suitable for the native OS service to read, the enterprise application may transmit the unencrypted content to the native OS service.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
    determining, by a processor of a mobile device, that a wrapped application requests to play encrypted media content using a native media player application, wherein the wrapped application is subject to control by an enterprise management system that restricts data transmission to and from the wrapped application based on a set of one or more policy files stored on the mobile device independent of the wrapped application;
    transmitting, by the processor and to the native media player application, a server path to a loopback web server within the wrapped application to elicit a request from the native media player application to the loopback web server for the media content;
    receiving, by the processor and from the native media player application, a request to retrieve the media content from the loopback web server; and
    responsive to determining that the request to retrieve the media content comprises the server path, sending the request to the loopback web server requesting the loopback web server to transmit an unencrypted version of the media content to the native media player.

2. The method of claim 1, further comprising:
    generating, by the processor, the loopback web server within the wrapped application; and
    generating, by the processor, the server path associated with the media content, wherein the loopback web server is instructed to retrieve the media content from a file path at which the media content is located within the wrapped application based on the server path.

3. The method of claim 1, further comprising:
    identifying, by the processor, a file path at which the media content is located within the wrapped application; and
    responsive to determining that the wrapped application requests to play the media content using the native media player application, generating the server path for transmission to the native media player application, wherein the server path is uniquely associated with the file path at which the media content is located within the wrapped application.

4. The method of claim 1, wherein the server path is identified using a security token, the method further comprising:
    determining, by the processor, whether the request from the media player application to retrieve the media content comprises the security token; and
    instructing, based on the security token, the loopback web server to decrypt the media content associated with the server path for transmission to the media player application.

5. The method of claim 4, wherein the security token comprises one of a randomized identifier and encrypted data.

6. The method of claim 1, further comprising restricting access to the loopback web server and the server path to applications and processes executing on the mobile device.

7. The method of claim 1, further comprising:
responsive to receiving the request from the native media player application, identifying by the loopback web server a file path of the media content, wherein said identifying comprises querying a mapping of associations between server paths and file paths of a plurality of different media content;
retrieving the media content located at the associated file path; and
instructing the loopback web server to generate the unencrypted version of the media content from the media content located at the identified file path for transmission to the native media player application.

8. One or more non-transitory computer readable storage media comprising computer readable instructions that, when executed, cause a device to perform:
determining, by a processor of the device, that a wrapped application requests to play encrypted media content using a native media player application, wherein the wrapped application is subject to control by an enterprise management system that restricts data transmission to and from the wrapped application based on a set of one or more policy files stored on the mobile device independent of the wrapped application;
transmitting, by the processor and to the native media player application, a server path to a loopback web server within the wrapped application to elicit a request from the native media player application to the loopback web server for the media content;
receiving, by the processor and from the native media player application, a request to retrieve the media content from the loopback web server; and
responsive to determining that the request to retrieve the media content comprises the server path, sending the request to the loopback web server requesting the loopback web server to transmit an unencrypted version of the media content to the native media player.

9. The computer readable storage media of claim 8, wherein the computer readable instructions further cause the device to perform:
generating, by the processor, the loopback web server within the wrapped application; and
generating, by the processor, the server path associated with the media content, wherein the loopback web server is instructed to retrieve the media content from a file path at which the media content is located within the wrapped application based on the server path.

10. The computer readable storage media of claim 8, wherein the computer readable instructions further cause the device to perform:
identifying, by the processor, a file path at which the media content is located within the wrapped application; and
responsive to determining that the wrapped application requests to play the media content using the native media player application, generating the server path for transmission to the native media player application, wherein the server path is uniquely associated with the file path at which the media content is located within the wrapped application.

11. The computer readable storage media of claim 8, wherein the server path is identified using a security token, and wherein the computer readable instructions further cause the device to perform:
determining, by the processor, whether the request from the media player application to retrieve the media content comprises the security token; and
instructing, based on the security token, the loopback web server to decrypt the media content associated with the server path for transmission to the media player application.

12. The computer readable storage media of claim 11, wherein the security token comprises one of a randomized identifier and encrypted data.

13. The computer readable storage media of claim 8, wherein the computer readable instructions further cause the device to perform restricting access to the loopback web server and the server path to applications and processes executing on the mobile device.

14. The computer readable storage media of claim 8, wherein the computer readable instructions further cause the device to perform:
responsive to receiving the request from the native media player application, identifying by the loopback web server a file path of the media content, wherein said identifying comprises querying a mapping of associations between server paths and file paths of a plurality of different media content;
retrieving the media content located at the associated file path; and
instructing the loopback web server to generate the unencrypted version of the media content from the media content located at the identified file path for transmission to the native media player application.

15. A system comprising:
a processor; and
memory storing computer readable instructions that, when executed, cause the system to perform:
determining, by the processor, that a wrapped application requests to play encrypted media content using a native media player application, wherein the wrapped application is subject to control by an enterprise management system that restricts data transmission to and from the wrapped application based on a set of one or more policy files stored on the mobile device independent of the wrapped application;
transmitting, by the processor and to the native media player application, a server path to a loopback web server within the wrapped application to elicit a request from the native media player application to the loopback web server for the media content;
receiving, by the processor and from the native media player application, a request to retrieve the media content from the loopback web server; and
responsive to determining that the request to retrieve the media content comprises the server path, sending the request to the loopback web server requesting the loopback web server to transmit an unencrypted version of the media content to the native media player.

16. The system of claim 15, wherein the computer readable instructions further cause the system to perform:
generating, by the processor, the loopback web server within the wrapped application; and
generating, by the processor, the server path associated with the media content, wherein the loopback web server is instructed to retrieve the media content from a file path at which the media content is located within the wrapped application based on the server path.

17. The system of claim 15, wherein the computer readable instructions further cause the system to perform:
    identifying, by the processor, a file path at which the media content is located within the wrapped application; and
    responsive to determining that the wrapped application requests to play the media content using the native media player application, generating the server path for transmission to the native media player application, wherein the server path is uniquely associated with the file path at which the media content is located within the wrapped application.

18. The system of claim 15, wherein the server path is identified using a security token, and wherein the computer readable instructions further cause the system to perform:
    determining, by the processor, whether the request from the media player application to retrieve the media content comprises the security token; and
    instructing, based on the security token, the loopback web server to decrypt the media content associated with the server path for transmission to the media player application.

19. The system of claim 15, wherein the computer readable instructions further cause the system to perform restricting access to the loopback web server and the server path to applications and processes executing on the mobile device.

20. The system of claim 15, wherein the computer readable instructions further cause the system to perform:
    responsive to receiving the request from the native media player application, identifying by the loopback web server a file path of the media content, wherein said identifying comprises querying a mapping of associations between server paths and file paths of a plurality of different media content;
    retrieving the media content located at the associated file path; and
    instructing the loopback web server to generate the unencrypted version of the media content from the media content located at the identified file path for transmission to the native media player application.

* * * * *